United States Patent [19]

Wilfert

[11] Patent Number: 4,687,526
[45] Date of Patent: Aug. 18, 1987

[54] METHOD OF MAKING AN IDENTIFICATION CARD

[75] Inventor: Ronald A. Wilfert, Boston, Mass.

[73] Assignee: Identification Systems Company L.P., Acton, Mass.

[21] Appl. No.: 817,242

[22] Filed: Jan. 8, 1986

[51] Int. Cl.$^4$ .................. B32B 31/12; B32B 31/20
[52] U.S. Cl. ............................ 156/64; 40/1.5; 40/625; 40/626; 156/277; 156/309.6; 283/77; 283/108; 283/109; 428/203; 428/916
[58] Field of Search .................. 40/1.5, 625, 626; 156/64, 277, 309.6; 283/75, 77, 82, 107, 108, 109; 428/916, 203

[56] References Cited

U.S. PATENT DOCUMENTS

| | | | |
|---|---|---|---|
| 3,245,697 | 4/1966 | Nugent | 283/82 |
| 3,640,009 | 2/1972 | Komiyama | 283/88 |
| 4,119,361 | 10/1978 | Greenaway | 283/88 X |
| 4,298,217 | 11/1981 | Moraw et al. | 283/108 |
| 4,560,426 | 12/1985 | Moraw et al. | 156/64 |

Primary Examiner—Robert A. Dawson
Attorney, Agent, or Firm—Cushman, Darby & Cushman

[57] ABSTRACT

A high-security identification card is produced in a system in which a photograph from a video camera is converted to digital data and reproduced with high-fidelity on a video display screen. Other images, such as signatures and fingerprints, can be treated in a similar manner using either a video camera or a CCD (charge-coupled device). After processing, the video information is displayed on the screen where it is combined with variable data typed in from a keyboard. The digital data from the terminal is fed into a laser printer that prints the portrait and any desired alphanumeric information on a paper sheet. The paper is then laminated, under heat and pressure, between two sheets of transparent thermoplastic material, at a temperature and pressure sufficient to cause the plastic material to penetrate the interstices between the fibers of the paper card and form a unitary structure that cannot be delaminated without destruction of the identifying data. The digital information is stored in a permanent memory to allow the card to be reproduced later, with or without modifications.

1 Claim, 3 Drawing Figures

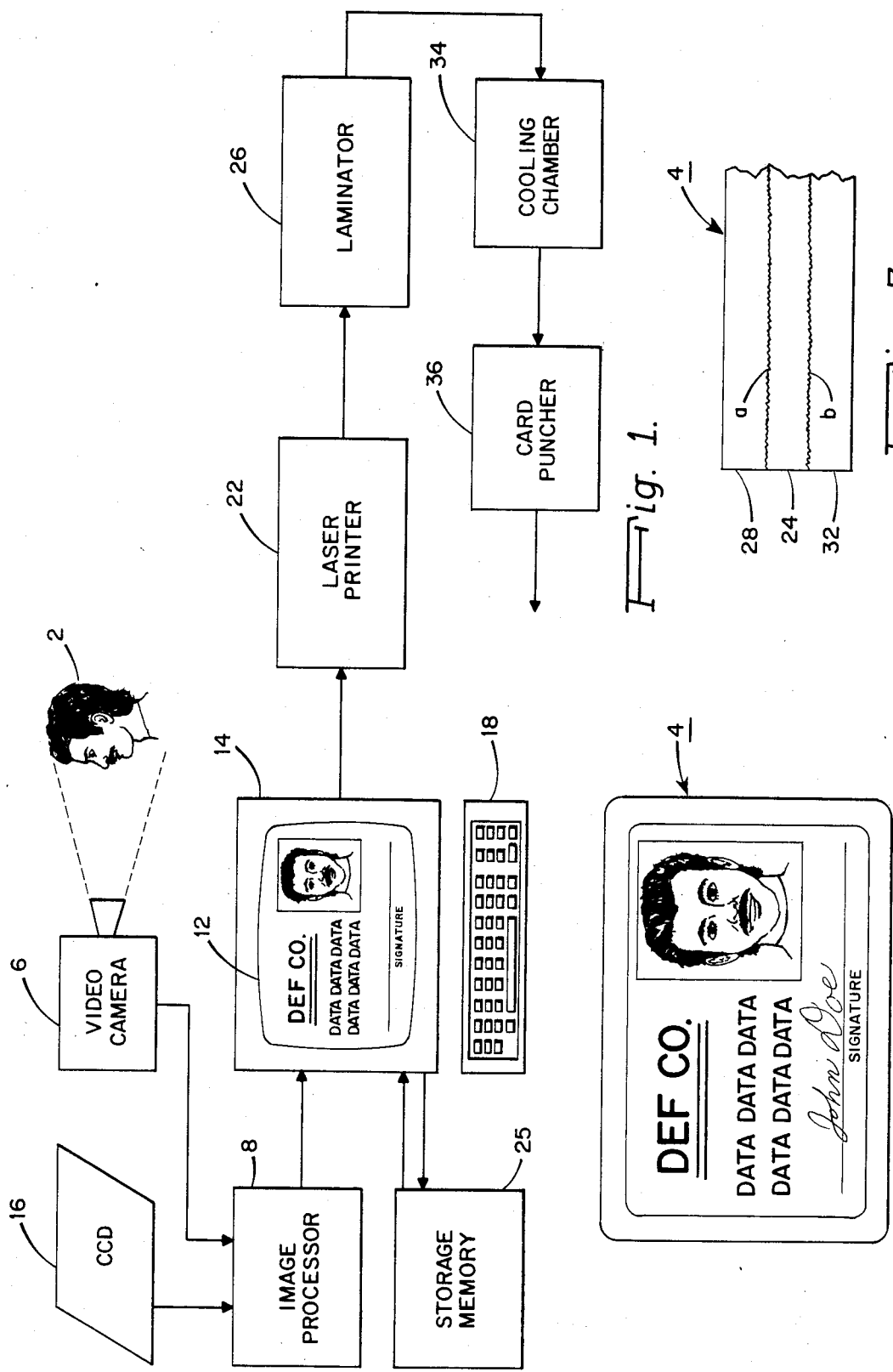

METHOD OF MAKING AN IDENTIFICATION CARD

BACKGROUND OF THE INVENTION

1. Field of the Invention:

This invention relates to identification cards and more particularly to an identification card having a layer of paper, carrying pertinent identification information embedded between two layers of protective plastic, and to the method of producing such a card.

2. Brief Description of the Prior Art:

Identification cards provide a quick and convenient means of providing personal identification. Such cards are widely used in connection with business transactions, control of access to restricted information or areas, and for various governmental identification functions. Many such cards carry a magnetized stripe encoded with the identification information or may have one or more photographs for identification purposes. Cards that carry photographs usually require the use of photographic film with its attendant processing costs. Such cards can represent a major expense in high volume applications such as national identity cards.

U.S. Pat. No. 3,640,009 to Komiyama describes an identification card in which a protective plastic layer is provided with a recess in which a paper insert carrying identification information is secured by adhesive. The edge portion of this plastic layer is laminated around its edges to another protective plastic sheet. The plastic used forms a filter that is transparent to either ultraviolet or infrared wavelengths which prevent the photographic image from being examined with ambient light. The construction described by Komiyama is expensive and is not suitable for high volume applications. An additional drawback is the requirement for specialized equipment to read the identification card.

U.S. Pat. No. 3,245,697 to Nugent describes an identification card carrying a photograph and other indicia which makes use of a photographic film as one of two plastic protective layers which enclose an information layer having opaque and transparent areas in the form of an intricate scroll. The card is read by ultraviolet light that is transmitted through the card. This card has all of the disadvantages of the one described by Komiyama.

U.S. Pat. No. 4,119,361 to Greenaway describes an identification card in which an internal information layer carries holograms, diffraction screens or miniature Fresnel prisms. That patent also discloses the use of a cellular structure for the information layer that prevents destruction of the information when the card layers are secured by chemical adhesives.

All of these identifications cards suffer from the high cost of production and their lack of suitability for high-volume low-cost applications requiring maximum security.

SUMMARY OF THE INVENTION

The present invention is incorporated in a high volume card production system in which a photograph from a video camera is converted to digital data and processed to permit reproduction of a high-quality portrait on a video display screen. Other images, such as signatures and fingerprints, can be treated in a similar manner using either a video camera or a CCD (charge-coupled device). After processing, the video information is displayed on the screen where it is combined with variable data typed in from a keyboard, or provided from another source. The video imges can be cropped, reduced or enlarged, and moved to any desired location on the video screen. The digital data from the terminal is fed into a laser printer that prints the portrait and any desired alphanumeric information on a paper card. This card is then laminated, under heat and pressure, between two sheets of transparent thermoplastic material, at a temperature and pressure sufficient to cause the plastic material to penetrate the interstices between the fibers of the paper card and form a unitary structure that cannot be delaminated without destruction of the identifying data.

BRIEF DESCRIPTION OF THE DRAWING

FIG. 1 is diagrammatic representation of the elements of a system for making a high-security identification card in accordance with the present invention;

FIG. 2 is a plan view of a card fabricated by the system represented by FIG. 1; and FIG. 3 is an enlarged cross section of a portion of the card shown in FIG. 2.

DESCRIPTION OF THE PREFERRED EMBODIMENT

The portrait of a person 2 or other object to be reproduced on a high-security identification card 4 is recorded by a conventional video camera 6 and the corresponding signal fed into an image processor 8. The processor 8 modifies the information from the camera 6 in such manner as to permit the presentation of a high quality reproduction on the screen 12 of a video display terminal 14. The portrait is represented by digital information in a manner representing a half-tone image, but formed in most cases by various sizes and shapes of image particles rather than half-tone dots of varying intensity. Software for providing such digitized images are already known and are produced by a number of companies including Interleaf Inc. of Cambridge, Mass., and as the Masscomp 500 computer program produced by Rise Technology Inc., Kendall Square, Cambridge, Mass.

Alternatively, the image may be produced by a scanning CCD 16 and may include a personal signature, finger prints or other information. This information is processed also by the image processor 8 and fed into the display terminal 14. The display terminal is provided with known controls to crop, reduce or enlarge the visual images and place them in any desired position on the screen 14.

Additional data to be included on the card 4 is typed into the display terminal from a conventional keyboard 18. When the information is displayed in the desired format on the screen 12, the signal from the terminal is fed into a laser printer 22 which reproduces the image on a paper sheet 24. The printer may be similar to those manufactured by Cannon, Inc. and preferably is capable of producing sheets large enough to hold a number of individual bodies of card information. For example, a single sheet of paper can be printed on both sides, in a single pass, with the information for as many as thirty identification cards. Line art can be printed with a resolution of 150 pairs per inch. Photographic information is printed with a resolution of 100 pixels per inch with 64 levels of gray. The digital information is also fed into a permanent memory 25 which permits the information to be recalled at a later time for modification or producing an additional identical card.

The printed sheet of paper is fed into a laminator 26 where the paper sheet is laminated under heat and pressure between two sheets 28 and 32 of transparent thermoplastic material, such as polyester. The pressure and heat are adjusted to melt the plastic sufficiently to cause it to penetrate the fibers of the paper, as indicated by the jagged lines "a" and "b" in FIG. 3. The lamination, including a number of individual identification cards, is passed through a cooling chamber 34 into a card puncher 36. The puncher 36 punches the individual cards 4 from the larger sheet.

As illustrated by FIG. 2, the finished card may include a portrait, a personal signature and printed data. As mentioned above, the card may be printed on both sides to provide additional information. If the card is printed on one side only, then only one sheet of the plastic laminate need be transparent.

The high cost of instant-type photograhic film and the cumbersome photographic processes are eliminated by the direct imaging process described here. The resulting card is economical to produce, since it eliminates all requirements for film, yet provides a highly secure identification card that is substantially impossible to alter. Any attempt to delaminate the card results in destruction of the information carried by the card. The system is flexible and any card in the system can be readily produced again, either in modified or identical form, by recalling from the memory 25 the digital information representing the card.

Additional security can be provided by using bank note paper with preprinted fine line coded patterns, such as that sold under the trademark Scrambled Indicia, by Graphic Security Systems Corporation, 505 Northern Boulevard, Great Neck, N.Y. Further security can be provided by the use of ultraviolet fluorescent or water soluable inks, water marks, or holograms.

I claim:

1. The method of fabricating an identification card comprising the steps of recording an identification image in the form of a first set of digital data, processing said first set of data to produce a visible reproduction of said image, providing a second set of digital data representing additional identification information, forming a visual image of both of said set of data, recording both of said sets of data in a permanent memory, printing by means of a laser printer a visual pattern controlled by said sets of data on a sheet of paper, and laminating said paper between two sheets of thermoplastic material, at least one of which is transparent to visible light, with sufficient heat and pressure to cause said plastic to penetrate interstices between the fibers of said paper.

* * * * *

REEXAMINATION CERTIFICATE (1664th)
United States Patent [19]
Wilfert

[11] B1 4,687,526

[45] Certificate Issued Mar. 24, 1992

[54] METHOD OF MAKING AN IDENTIFICATION CARD

[75] Inventor: Ronald A. Wilfert, Boston, Mass.

[73] Assignee: Lasercard Company L.P.

Reexamination Request:
No. 90/002,119, Aug. 29, 1990

Reexamination Certificate for:
Patent No.: 4,687,526
Issued: Aug. 18, 1987
Appl. No.: 817,242
Filed: Jan. 8, 1986

[51] Int. Cl.⁵ .................... B32B 31/12; B32B 31/20
[52] U.S. Cl. ................................. 156/64; 40/1.5;
40/625; 40/626; 156/277; 156/309.6; 283/77;
283/108; 283/109; 346/1.1; 346/134; 428/203;
428/916
[58] Field of Search ............... 283/95, 85, 86, 108,
283/904, 75, 77, 82, 78; 156/64, 277, 309.6;
40/1.5, 625, 626; 428/916, 203; 382/4

[56] References Cited

U.S. PATENT DOCUMENTS

| | | | |
|---|---|---|---|
| Re. 25,005 | 7/1961 | Hannon | 283/108 X |
| 2,395,804 | 3/1946 | De Gruchy | |
| 2,715,514 | 7/1955 | English, Jr. | 283/78 X |
| 3,245,697 | 4/1966 | Nugent | 283/78 X |
| 3,867,571 | 2/1975 | Starkweather et al. | 350/486 |
| 4,014,030 | 3/1977 | Stark | 358/481 X |
| 4,057,919 | 11/1977 | Gauch et al. | 40/2.2 |
| 4,229,023 | 10/1980 | Luz | 283/78 X |
| 4,278,722 | 7/1981 | Hoppe et al. | 428/192 |
| 4,429,015 | 1/1984 | Sheptak | 283/904 X |
| 4,467,335 | 8/1984 | Schmidt et al. | 346/160 |
| 4,504,357 | 3/1985 | Holbein et al. | 162/123 |
| 4,510,619 | 4/1985 | LeBrun et al. | 235/432 X |
| 4,536,013 | 8/1985 | Haghiri-Therani et al. | 283/77 |
| 4,544,181 | 10/1985 | Maurer et al. | 283/74 |
| 4,544,184 | 10/1985 | Freund et al. | 283/94 |
| 4,545,838 | 10/1985 | Minkus | 283/904 X |
| 4,596,409 | 6/1986 | Holbein et al. | 283/75 |
| 4,613,877 | 9/1986 | Spencer et al. | 346/160 |
| 4,663,518 | 5/1987 | Borror et al. | 235/487 |
| 4,692,394 | 9/1987 | Drexler | 430/140 |

FOREIGN PATENT DOCUMENTS

| | | |
|---|---|---|
| 0113228 | 7/1984 | European Pat. Off. |
| 2266245 | 10/1975 | France |
| 2449930 | 9/1980 | France |
| 55-42852 | 3/1980 | Japan |
| WO82/04149 | 11/1982 | PCT Int'l Appl. |
| 8300766 | 3/1983 | PCT Int'l Appl. |

*Primary Examiner*—Jeff H. Aftergut

[57] ABSTRACT

A high-security identification card is produced in a system in which a photograph from a video camera is converted to digital data and reproduced with high-fidelity on a video display screen. Other images, such as signatures and fingerprints, can be treated in a similar manner using either a video camera or a CCD (charge-coupled device). After processing, the video information is displayed on the screen where it is combined with variable data typed in from a keyboard. The digital data from the terminal is fed into a laser printer that prints the portraits and any desired alphanumeric information on a paper sheet. The paper is then laminated, under heat and pressure, between two sheets of transparent thermoplastic material, at a temperature and pressure sufficient to cause the plastic material to penetrate the interstices between the fibers of the paper card and form a unitary structure that cannot be delaminated without destruction of the identifying data. The digital information is stored in a permanent memory to allow the card to be reproduced later, with or without modifications.

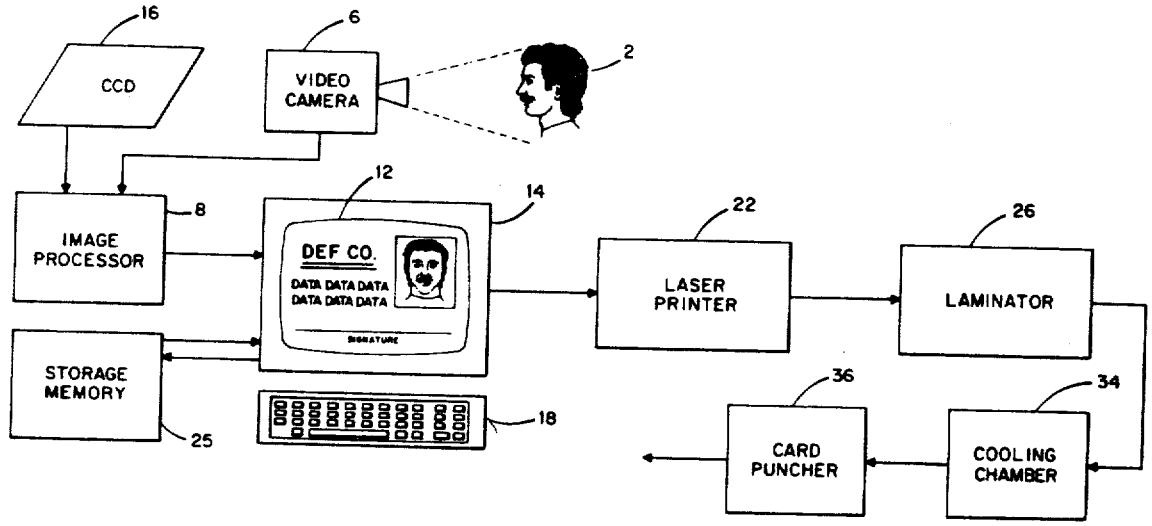

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

* * * * *